W. H. PRATT.
ELECTRIC METER.
APPLICATION FILED APR. 2, 1914.

1,180,795.

Patented Apr. 25, 1916.

Witnesses:
Carl G. Klock
J. Ellis Elen

Inventor:
William H. Pratt
by Albright, Davis
His Attorney.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ELECTRIC METER.

1,180,795.

Specification of Letters Patent.

Patented Apr. 25, 1916.

Application filed April 2, 1914. Serial No. 828,957.

*To all whom it may concern:*

Be it known that I, WILLIAM H. PRATT, a citizen of the United States, residing at Lynn, in the county of Essex, State of Massachusetts, have invented certain new and useful Improvements in Electric Meters, of which the following is a specification.

My invention relates to electric meters, and particularly to electric meters of the induction type.

The object of my invention is to provide a novel and improved construction of friction compensating plate and phase-lagging plate, and more particularly to provide a novel combined friction compensating and phase-lagging device.

The features of my invention which I consider novel and patentable are definitely pointed out in the claims appended hereto.

Figure 1:
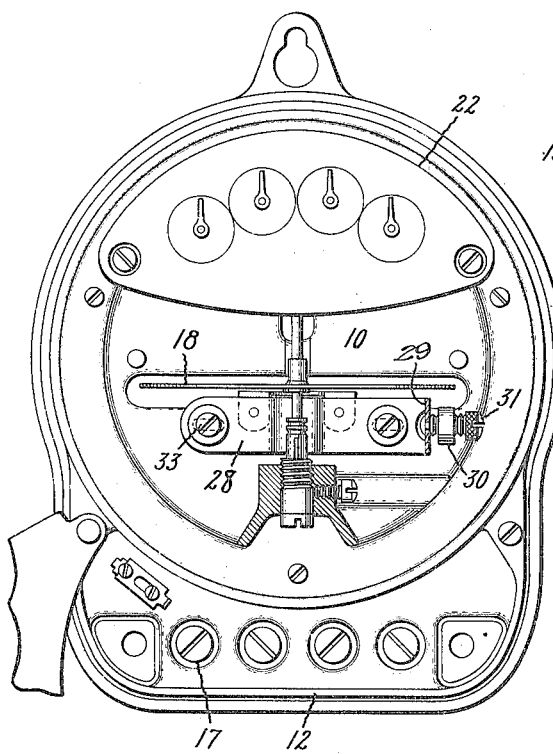
Figure 2:
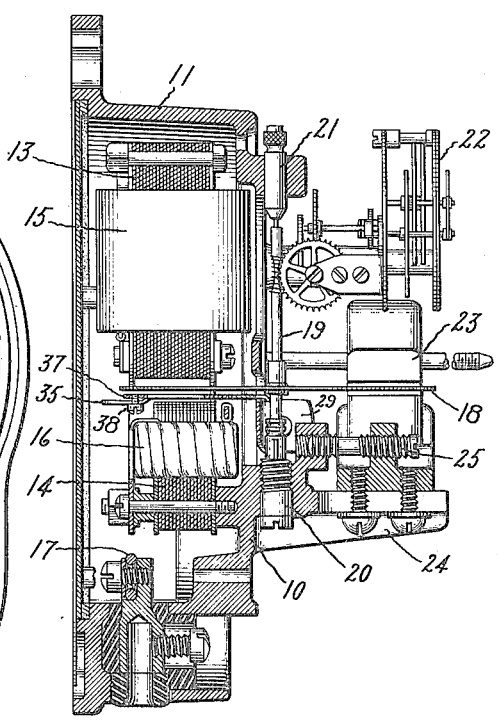

The novel features of construction and the operation of a combined friction compensating and phase-lagging device embodying my invention will be understood from the following description taken in connection with the accompanying drawings, in which:

Figure 1 is a front elevation of an induction meter, with the cover removed and damping magnets cut away, illustrating the means of attaching my novel combined friction compensating and phase-lagging device to the meter; Fig. 2 is a sectional end elevation of the meter; and Fig. 3 is a perspective view of my novel combined friction compensating and phase-lagging device.

The induction meter in connection with which I have herein illustrated and described my present invention, by way of example, is described in detail in an application for patent filed jointly by Peter C. Morganthaler and myself, on March 12, 1914, Serial No. 842,274. This meter comprises a central supporting member 10 of magnetic material integrally cast with a cylindrical member 11 and a terminal chamber 12. The magnetic circuit of the meter comprises a potential core 13 consisting of the usual bundle of magnetic laminations, and a coöperatively related and similarly constructed series or current core 14. The core 13 carries a potential coil 15, and the core 14 carries two current coil 16, these coils being suitably connected to terminals 17. The cores and coils constitute the motive elements of the meter, and are suitably mounted on the supporting member 10. A disk armature 18 of aluminum or other suitable material is secured to a rotatably mounted shaft 19. The shaft has a lower step bearing 20 and an upper bearing 21, both operatively mounted on the supporting member 10. The shaft 19 is operatively connected through ratio or reduction gearing to the meter register 22. Damping magnets 23 are suitably secured to a bracket 24 and are arranged to damp or retard the rotation of the armature in the well understood manner. The damping magnets are provided with a micrometer adjusting attachment comprising a right hand and left hand screw-threaded bolt 25, which when turned moves the magnets with respect to the armature.

The friction compensating or light load adjustment of the meter and the 90 degree phase lag between the potential and series fluxes is obtained by a friction compensating and phase lagging device made up of two separate short-circuiting plates of conducting material. This friction compensating and phase lagging device is constructed in accordance with the present invention of two concentric metallic circuits, which may be of different electric conductivities. The device may be considered as a combined friction compensating and phase lagging means made up of two separate and relatively adjustable plates. In the example illustrated, one of these plates provides an electric circuit of relatively low resistance, and its adjustment is primarily designed as a means of adjusting the phase lag of the potential flux, and, accordingly, I have termed this plate the phase lagging plate. On the other hand, the second plate provides an electric circuit of relatively high resistance, and its adjustment is primarily designed as a means for compensating the meter for friction and light loads, and, accordingly, I have termed this plate the friction compensating plate. It will of course be understood that each plate performs to a greater or less extent both the functions of friction compensation and phase lagging, but each constitutes the principal adjusting means for the particular function indicated by its name.

Figure 3:
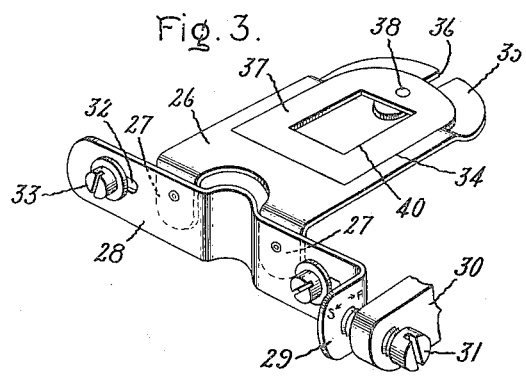

The construction of my novel friction compensating and phase lagging device will be clearly understood by reference to Fig. 3.

3 of the drawings. The device consists of a friction compensating plate 26 and a phase lagging plate 37 secured together to form a single unitary structure. The device is operatively mounted in the air gap between the two magnetic cores 13 and 14 and parallel to the disk armature 18, as shown in Figs. 1 and 2 of the drawings. The configuration of the friction compensating plate 26 is clearly shown in Fig. 3. The plate 26 has bent lugs 27 secured to an attaching member 28. The attaching member has a bent lug 29. An adjusting bolt 31 passes through a screw-threaded hole in a boss 30 integrally attached to the supporting member 10, and is secured at its end to the lug 29, as shown in Fig. 1 of the drawings. The adjusting bolt 31 thus serves as a means for adjusting the position of the combined friction compensating and phase lagging device with respect to the poles of the magnetic cores. The attaching plate is provided with slots 32 through which extend set screws 33, the latter engaging in screw-threaded holes in the supporting member 10 and serving to rigidly secure the device in its adjusted position.

The friction compensating plate 26 is provided with a substantially rectangular hole 34. A portion 35 of the plate 26 on one side of the hole 34 is offset. This offset portion 35 is provided with a slot 36 extending in a short distance from the outside edge of the plate. A substantially rectangular phase-lagging plate 37 having a substantially rectangular hole 40 is operatively positioned in the hole 34 and is provided with a set screw 38 which extends through the slot 36, whereby the position of the plate 37 with respect to the plate 26 can be adjusted and the two plates secured together in the adjusted position. The offset of the portion 35 is such that the surfaces of the friction compensating plate 26 and phase-lagging plate 37 lie in substantially the same planes, as will be best seen in Fig. 3 of the drawings. The phase-lagging plate is so adjusted that the desired phase lag of 90 degrees between the series and potential fluxes is obtained, as will be understood by those skilled in the art.

The friction compensating plate is preferably constructed of German silver, brass or similar metallic material, while the phase-lagging plate is preferably constructed of a metallic material having a higher specific conductivity than the material of the friction compensating plate, as for example, copper or aluminum. The resistance of the lag plate is thus lower than that of the friction compensating plate and a sufficient range of lag adjustment is thereby insured. The friction compensating plate of course produces a certain phase lag, but it is desirable to produce the greater part of the phase lag by the phase-lagging plate, and this is accomplished by making the resistance of the phase-lagging plate lower than that of the friction compensating plate. It will be obvious that the desired difference in resistance of the two plates may be secured by properly proportioning the dimensions of the two plates, and thus the two plates may be constructed of the same metallic material. The construction of the plates of dissimilar metallic materials of different specific resistances together with proper proportioning of the dimensions of the plates affords, however, a more satisfactory and convenient means for securing the proper friction compensating and phase lag adjustment.

When the combined friction compensating and phase lagging device is centrally positioned with respect to the poles of the potential core the shading effects of the two short-circuiting plates 26 and 37 produce no resultant motive torque. Movement of the device from this neutral position in either direction develops a motive torque in one direction or the other as the case may be. It will of course be understood that both plates are instrumental in the development of this motive torque since each causes a shading effect of the potential core. It is, however, desirable in practice to distinguish the plates, and, as hereinbefore stated, it has been found most convenient to refer to the plate 26 as the friction compensating plate, since the adjustment of this plate is provided for the adjustment of the friction compensation. Adjustment of the plate 26 and the consequent movement of the plate 37 have little or no effect on the phase lag. Movement of the plate 37 in the hole 34 of the plate 26 varies the phase lag of the potential flux, and the proper phase lag is obtained by adjusting the plate 37, and since the adjustment of the plate 37 is provided for the purpose of adjusting the phase lag I find it convenient in practice to designate such plate as the phase lagging plate. The conductivity of the plate 37 is designed so as to give a suitable range of adjustment of the phase lag. The plate 37 is responsible for a certain proportion of the total phase lag of the potential flux and this proportion can be varied by varying the relative conductivities of the plates 26 and 37. The greater the relative conductivity of the plate 37 the greater will be the relative adjustment of the phase lag for the same movement of this plate, and hence it will be clear that the range of adjustment of the phase lag can be varied by suitably proportioning the relative conductivities of the plates 26 and 37. In the limiting case the plate 26 may be an insulator, under which condition it serves, first, as a carrier upon which the plate 37 is adjustably mounted for the purpose of varying the phase lag of the potential flux, and, second, as an adjustable supporting means by whose adjustment the motive effect of the plate 37 may be varied.

The mounting of the phase-lagging plate on the friction compensating plate results in a single unitary structure which is convenient of access, easily adjusted, and occupies little space in the air gap between the magnetic cores. The adjusting bolt 31 is very conveniently positioned in front of the supporting member 10, and is readily accessible when the cover of the meter is removed, as illustrated in Fig. 1 of the drawings.

Legends S and F are stamped on the lug 29 to indicate the proper direction to turn the adjusting bolt 31 to produce a slower or faster light-load rotation of the disk armature.

It will be obvious that the phase-lagging plate need not necessarily be adjustable, since it is possible to so design and mount this plate that its resistance and position with respect to the friction compensating plate produce the desired phase lag.

Numerous modifications and changes in the details of construction of my novel combined friction compensating or phase-lagging device will be apparent to those skilled in the art. I do not, therefore, desire to limit my invention to the specific construction herein illustrated and described by way of example, but I aim in the appended claims to cover all modifications of my invention within the spirit and scope thereof.

What I claim as new and desire to secure by Letters Patent of the United States, is:—

1. In an induction electric motor meter, a combined friction compensating and phase lagging device comprising, a friction compensating plate of conducting material, and a phase lagging plate of conducting material mounted on the friction compensating plate thereby forming a unitary friction compensating and phase lagging device.

2. In an induction electric motor meter, a combined friction compensating and phase lagging device comprising, a friction compensating plate adjustably secured to a fixed part of the meter, and a phase lagging plate adjustably mounted on the friction compensating plate.

3. In an induction electric motor meter, a combined friction compensating and phase lagging device comprising, a friction compensating plate of conducting material having a hole therein and adjustably secured to a fixed part of the meter, and a phase lagging plate of conducting material adjustably mounted in said hole.

4. In an induction electric motor meter, a combined friction compensating and phase lagging device comprising, a friction compensating plate of conducting material having a rectangular hole therein, means for adjustably securing said plate to a fixed part of the meter, and a rectangular phase lagging plate of conducting material adjustably mounted in said hole.

5. In an induction electric motor meter, a combined friction compensating and phase lagging device comprising, a friction compensating plate, and a phase lagging plate mounted on the friction compensating plate, said plates offering paths of different resistances to the flow of an electric current whereby the proper friction compensation and phase lag adjustment are obtained.

6. In an induction electric motor meter, a combined friction compensating and phase lagging device comprising, a friction compensating plate of conducting material, and a phase lagging plate of lower resistance than the friction compensating plate and mounted on the friction compensating plate thereby forming a unitary friction compensating and phase lagging device.

7. In an induction electric motor meter, a combined friction compensating and phase lagging device comprising, a friction compensating plate, and a phase lagging plate mounted on said friction compensating plate, said phase lagging plate being of a material having a higher specific conductivity than the material of the friction compensating plate.

8. In an induction electric motor meter, a combined friction compensating and phase lagging device comprising, a friction compensating plate, and a phase lagging plate suitably mounted on the friction compensating plate, thereby forming a unitary friction compensating and phase lagging device, the resistances of said plates being such that the proper friction compensation and phase lag adjustment are obtained.

9. In an induction electric motor meter, a combined friction compensating and phase lagging device comprising, a friction compensating plate of German silver, and a phase lagging plate of copper mounted on the friction compensating plate thereby forming a unitary friction compensating and phase lagging device.

10. In an induction electric motor meter, a combined friction compensating and phase lagging device comprising, a friction compensating plate adjustably secured to a fixed part of the meter, and a phase lagging plate mounted on the friction compensating plate thereby forming a unitary friction compensating and phase lagging device, said plates being of dissimilar metallic materials having different specific conductivities whereby the proper friction compensation and phase lag adjustment are obtained.

11. In an induction electric motor meter, a combined friction compensating and phase lagging device comprising, a friction compensating plate and a phase lagging plate secured together to form a single unitary structure, the conductivity of said plates being such that each plate offers a path of different resistance to the flow of an electric current whereby the proper friction compensation and phase lag adjustment are obtained.

12. In an induction electric motor meter, a combined friction compensating and phase lagging device comprising, a friction compensating plate, a phase lagging plate mounted on the friction compensating plate and offering a path to the flow of current of lower resistance than the path offered by the friction compensating plate, and means whereby said phase lagging plate can be adjusted with respect to said friction compensating plate.

13. In an induction electric motor meter, a combined friction compensating and phase lagging device comprising, a friction compensating plate, a phase lagging plate mounted on said friction compensating plate, and means whereby the position of said phase lagging plate with respect to said friction compensating plate can be adjusted, said plates being of dissimilar metallic materials and the specific conductivity of the material of the phase lagging plate being higher than the specific conductivity of the material of the friction compensating plate whereby the proper friction compensation and phase lag adjustment can be obtained.

14. In an induction electric motor meter, a friction compensating and phase lagging device comprising a metallic plate having a hole therein, the portion of said plate on one side of said hole being offset and having a slot therein, and a metallic frame fitting said hole and provided with a set-screw extending through said slot, the offset in said plate being such that the surfaces of the plate and frame lie in substantially the same planes.

15. In an induction electric motor meter, a friction compensating and phase lagging device comprising a friction compensating plate having a rectangular hole therein, the portion of said plate on one side of said hole being offset and having a slot therein, a rectangular phase lagging plate positioned in said hole and provided with a set screw extending through said slot and adapted to adjustably secure the lagging plate to the friction compensating plate, the offset in said friction compensating plate being such that the surfaces of the friction compensating plate and lagging plate lie in substantially the same planes, an attaching member secured to said friction compensating plate means operatively related to a fixed part of the meter and coöperating with said attaching member for adjusting the position of the friction compensating plate, and means for securing the friction compensating plate to a fixed part of the meter in its adjusted position.

16. In an induction electric motor meter, a combined friction compensating and phase lagging device comprising, a supporting member, means providing a short-circuited electric current path mounted on said supporting member, and means for securing said supporting member to a fixed part of the meter, each of said two last mentioned means being adjustable whereby the friction compensation and the phase lag of the potential flux can be adjusted.

17. In an induction electric motor meter, a combined friction compensating and phase lagging device comprising, a supporting member, and means providing a short-circuited electric current path mounted on said supporting member and adapted to be adjusted with respect to the supporting member for adjusting the phase lag of the potential flux of the meter, said supporting member being adjustably secured to a fixed part of the meter whereby the friction compensation of the meter can be adjusted by adjustment of the supporting member.

In witness whereof, I have hereunto set my hand this twenty-eighth day of March, 1914.

WILLIAM H. PRATT.

Witnesses:
 JOHN A. MCMANUS, Jr.,
 FRANK G. HATHE.

Copies of this patent may be obtained for five cents each, by addressing the "Commissioner of Patents, Washington, D. C."